United States Patent [19]

Krauss et al.

[11] 4,346,635
[45] Aug. 31, 1982

[54] SLITTER WITH REMOVABLE HEAD

[75] Inventors: Ferdinand A. Krauss; Ivan S. Ganyard, both of Bay Village; Raymond E. Sabbatis, North Olmsted, all of Ohio

[73] Assignee: Loopco Industries, Inc., Twinsburg, Ohio

[21] Appl. No.: 91,115

[22] Filed: Nov. 5, 1979

[51] Int. Cl.³ .................... B26D 1/24; B23D 19/04
[52] U.S. Cl. ...................................... 83/479; 83/481; 83/498; 83/552; 83/482; 83/503
[58] Field of Search ............... 83/344, 479, 481, 482, 83/503, 507, 508.2, 508.3, 563, 492, 498, 552; 72/238, 239, 248; 100/155 R, 168

[56] References Cited

U.S. PATENT DOCUMENTS

| | | | |
|---|---|---|---|
| 95,284 | 9/1869 | Sweet | 83/507 |
| 2,210,018 | 8/1940 | Yoder | 83/481 |
| 2,222,051 | 11/1940 | Tyrrell | 83/503 |
| 2,583,844 | 1/1952 | Hill | 72/329 |
| 2,792,060 | 5/1957 | Bruns | 83/481 |
| 3,212,314 | 10/1965 | Sieger | 83/329 |
| 3,257,887 | 6/1966 | Jones | 83/503 |
| 3,491,642 | 1/1970 | Weyant | 83/503 |
| 3,513,743 | 5/1970 | Montguire | 83/479 |
| 3,548,480 | 12/1970 | Daniels | 83/563 |
| 3,727,503 | 4/1973 | Braner et al. | 83/481 |
| 4,112,798 | 9/1978 | Yoshizawa | 83/344 |
| 4,183,273 | 1/1980 | Greinke et al. | 83/479 |
| 4,226,151 | 10/1980 | Littley et al. | 83/479 |
| 4,236,431 | 12/1980 | Gawlik et al. | 83/479 |

FOREIGN PATENT DOCUMENTS 573376 3/1933 Fed. Rep. of Germany ........ 83/479
2701571 7/1978 Fed. Rep. of Germany ........ 72/239

OTHER PUBLICATIONS

Advertising Bulletin of Loopco Industries, Inc. of Cleveland, Ohio entitled "Interchangeable Slitter Heads", (7 pages), copyright 1973.

Primary Examiner—James M. Meister
Assistant Examiner—K. Bradford Adolphson
Attorney, Agent, or Firm—Hamilton, Renner & Kenner

[57] ABSTRACT

A slitter and readily removable head includes a drive housing and an idle housing projecting from a base with the arbors for the slitting knives extending between the housings. The lower arbor is journaled in vertically movable blocks with a jack system in the base thus moving the lower arbor. The idle housing and arbors are movable on the base as a unit away from the drive housing so that the idle housing and arbors may readily be removed and replaced. The lower arbor journal block of the idle housing includes a T-slot socket engageable with one or more jacks at a certain horizontal position so that arbors of different length may be employed. The idle housing and arbors forming the removable head contain no gearing, jacks, jack drive connections or fluid or electrical lines requiring connection or disconnection. A turntable may be employed to move the disconnected head to a storage or retooling location. An overhead crane may also be employed to remove or replace the head from or to the storage or tooling location. The slitter includes a horizontally movable actuator with locating pins for quick assembly.

6 Claims, 9 Drawing Figures

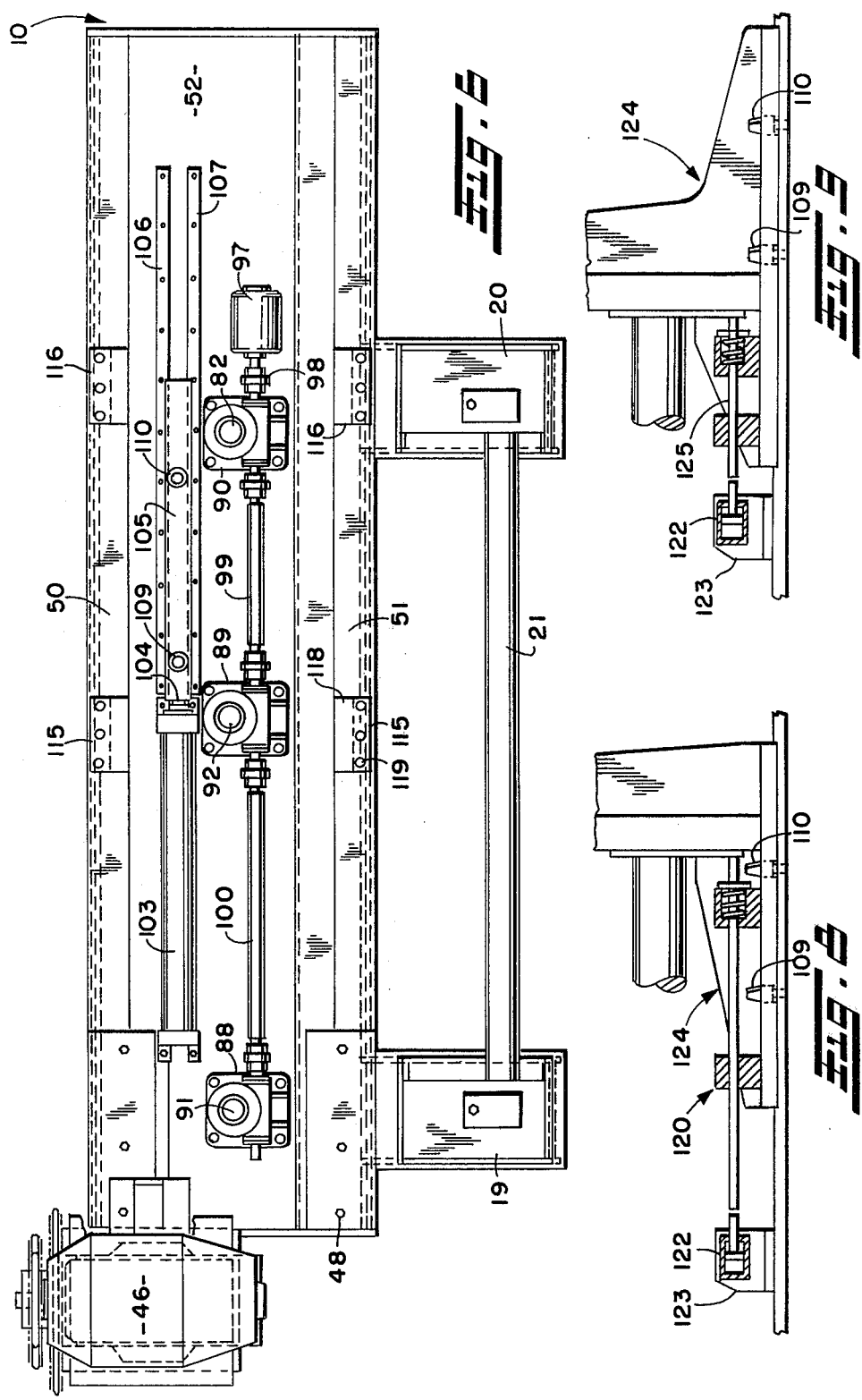

SLITTER WITH REMOVABLE HEAD

This invention relates generally as indicated to a slitter and more particularly to a metal slitter having a readily removable slitter head.

BACKGROUND OF THE INVENTION

In a slitting line, relatively wide strip is cut in to a number of relatively narrower widths usually by pulling the strip through a slitter. The slitter includes parallel arbors on which the slitting knives are positioned. Usually the top arbor is positioned by hydraulically operated jacks to be moved in parallelism with the bottom arbor to control the vertical spacing of the cooperating knives.

The slitting knives may be placed on the arbors at any desired location to control the number and widths of the slit strip. However, if variations are desired in the number and widths of the slit strip, or if the grade or gage of the metal strip changes, the spacing of the knives on the arbors may require to be changed. Such variations occur frequently and to change the set up of the knives usually requires partial disassembly of the slitter to expose the ends of the arbors so that the knives and spacers may be removed and replaced. The set up of the slitting knives is a time consuming operation and if the set up is done at the slitting line, it requires that the slitting line be down or inoperative for an inordinate length of time.

This problem has to some extent been obviated by the use of slitting lines employing multiple heads. The heads may be mounted on a turret and the heads rotated into and out of operative position. Reference may be had to U.S. Pat. Nos. 3,513,743 and 3,727,503 for illustrations of multiple head slitters utilizing a turntable. Such turret arrangements, however, require a significant capital investment which must be balanced against the down time of the slitting line to make set-up changes. Moreover, when hydraulically operated jacks are employed which must be connected and disconnected during set-up changes, additional down time is required both to disconnect the jacks and any electrical or hydraulic lines involved and also to reset the jacks with the aid of a counter or other suitable mechanism to insure proper arbor parallelism. If the jacks are disconnected, they must usually be carefully reset because of the backlash in the gearing employed.

In many slitting operations space is a significant obstacle and it may not be possible or desirable to retool the slitter at the slitting line. It may be more desirable to retool the slitter at a work area or bench where an inventory of knives and spacers are conveniently kept. Most slitting operations include an overhead crane and it is accordingly desirable to have a removable slitter head which can be conveniently lifted to another location for retooling and returned when desired. However, a crane in a slitting operation has many other uses and it may be available precisely when desired. Accordingly, a slitter head which can quickly be removed to and replaced from a lift off or storage position is highly desirable.

If multiple slitter heads are employed, it is important that they be as simple or inexpensive as possible and that they can be connected and disconnected from the slitter as quickly as possible.

SUMMARY OF THE INVENTION

In a slitter, the arbors are journaled for rotation between a drive housing and an idle housing projecting from a base. The drive housing includes gearing interconnecting the arbors for opposite hand rotation and also a connection to a power source. Thus, if the drive housing is part of a removable head, a drive train disconnect must be made and the head then includes the arbor interconnecting gearing which adds to the cost of the removable head and to the time required to remove and replace the head. Also, if jacks are employed on top of the heads for movement of the upper arbor, such jacks must form part of the head or be disconnected, reconnected, and then synchronized.

In a removable head slitter, it is therefore desirable that the idle housing only, together with the arbors form the removable head. It is also desirable that the jacks be provided for the lower arbor and that the head be movable and replaceable without disconnecting the jacks from each other or the jack drive. It is important to have a removable head for a slitter which has as few parts as possible and as few connection and disconnection requirements as possible. It is also desirable to have a slitter which provides the type of removable head as indicated which can quickly and easily be replaced or lifted from the slitter or an adjacent storage location for retooling.

It is a principal object of the present invention to provide a slitter which includes a readily removable and replaceable head which is of low cost construction.

Another principal object is the provision of such slitter and head wherein the head may be removed and replaced without disconnecting the jacks or jack drive or other mechanical, hydraulic or electrical connections.

Another important object is the provision of a slitter wherein the idle housing and arbors form a removable head which may be disconnected from the slitter simply by horizontal movement of the idle housing.

Still another principal object is the provision of such slitter wherein the jacks are in the base and the jacks for the lower arbor journal of the idle housing may be disconnected and reconnected by such horizontal movement.

Another object is the provision of such slitter wherein the journal block of the lower arbor of the idle housing includes a T-slot and the top of the jack includes a disc interfitting with the slot on horizontal movement of the idle housing to its assembled position.

A further object is the provision of a slitter and a removable head therefor wherein the removable head is driven by a horizontal actuator for movement to a position from which the head may be removed from the slitter either by vertical or horizontal movement.

Still another object is the provision of a slitter which includes a two-unit turntable facilitating the quick replacement of one removable head with another.

A still further object is the provision of a slitter which includes more than one location and associated jack for the removable head so that arbors of different axial length may readily be employed.

Other objects and advantages of the present invention will become apparent as the following description proceeds.

To the accomplishment of the foregoing and related ends of the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 4 is an end elevation of the slitter as seen from the right hand side of FIG. 3;

FIG. 5 is a fragmentary vertical section through one form of locater and the actuator for the removable head illustrating the locater in its retracted position;

FIG. 6 is a top plan view of the base of the slitter illustrating the location of the jacks and the actuator for horizontal movement of the removable head;

FIG. 7 is a fragmentary top plan view of a slitter in accordance with the present invention utilizing a two-position turntable to facilitate the quick removal and replacement of the removable head;

FIG. 8 is a fragmentary schematic illustration of the journal box lock-up for the head having longer arbors, and;

FIG. 9 is a similar view of the lock-up or the head having shorter arbors.

DETAILED DESCRIPTION OF THE DRAWINGS

Figure 1:
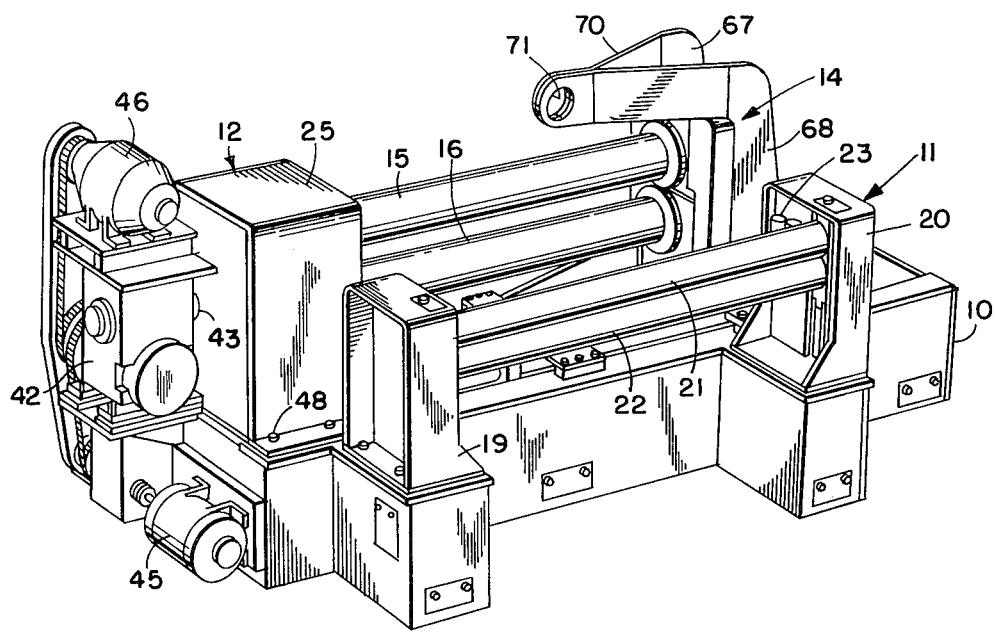
FIG. 1 is an isometric view of a slitter in accordance with the present invention with the rotary knives and spacers on the arbors being omitted for ease of illustration.
Figure 2:
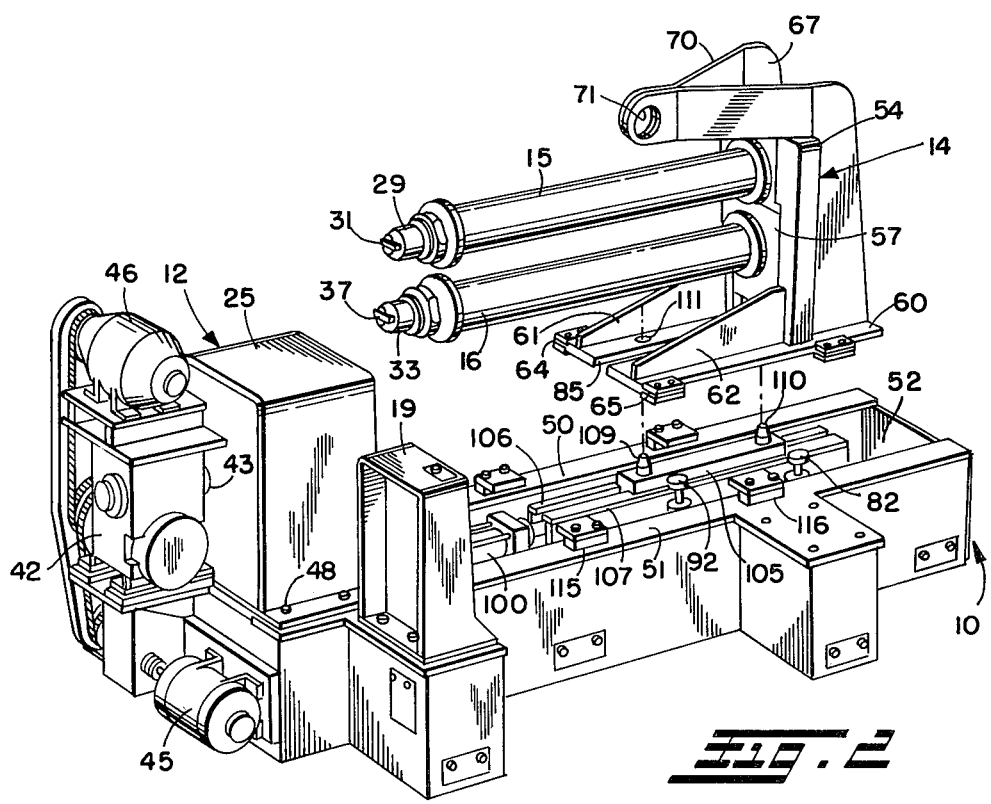
FIG. 2 is a view similar to FIG. 1 with the entry housing partially removed and the removable head retracted and vertically disassembled from the base of the slitter.
Figure 3:
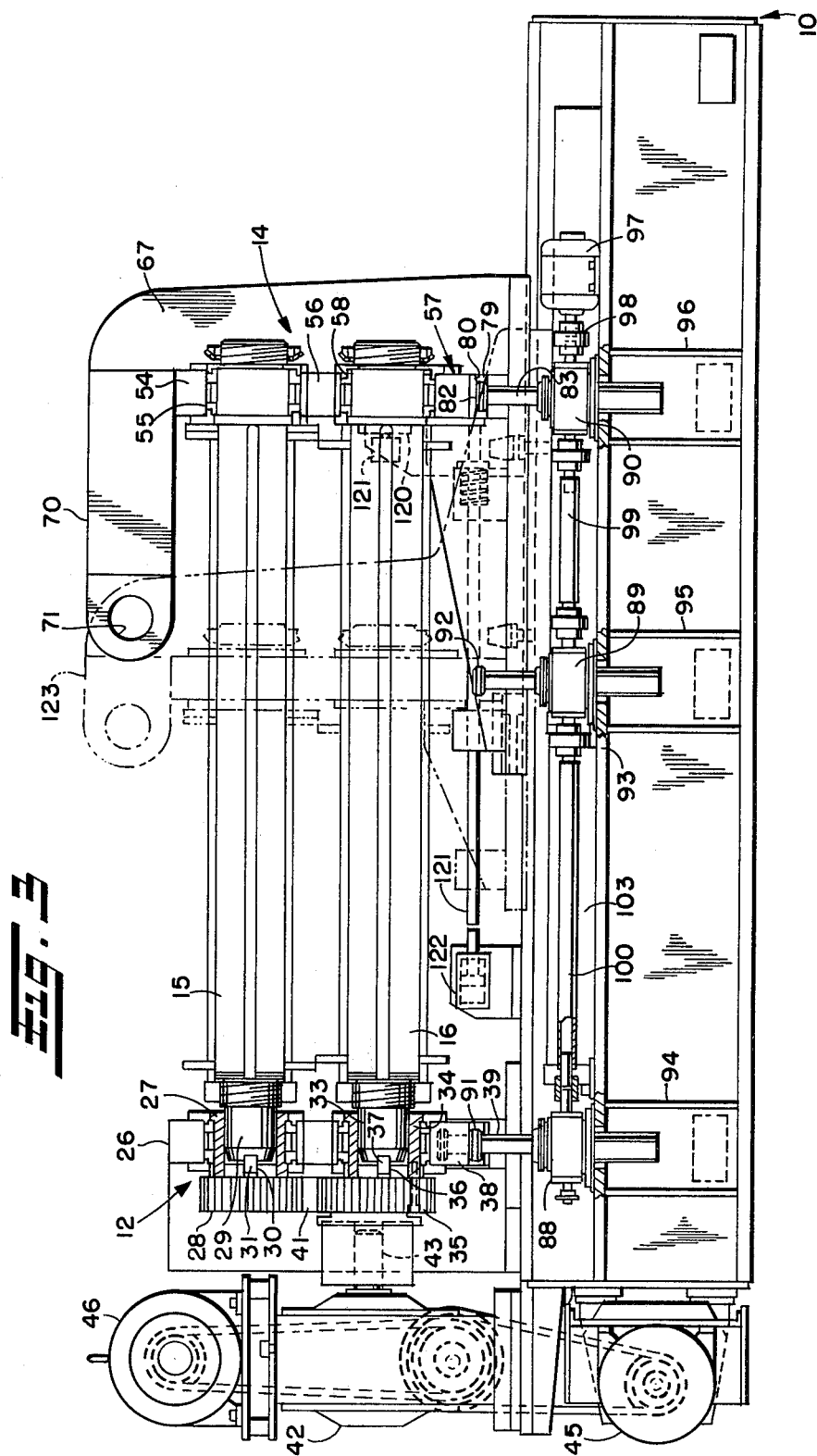
FIG. 3 is an enlarged front elevation of the slitter partially broken away and in section illustrating in solid lines one form of removable head with longer arbors and in phantom lines another form of removable head with shorter arbors which can readily be accommodated by the slitter.

Referring first to FIGS. 1, 2 and 3, it will be seen that the slitter comprises a fabricated base 10 from the top of which project drive housing 12 and idle housing 14 between which are journaled upper and lower arbors 15 and 16, respectively, on which the slitting knives and spacers are mounted.

Immediately in front of the slitter is an entry table or stand 18, partially removed in FIG. 2, which includes housings 19 and 20 between which are journaled pinch rolls 21 and 22. Each housing is also provided with side guide rolls as seen at 23, such rolls facilitating the feeding of the leading edge of strip from an uncoiler to the slitter.

The drive housing 12, shown in FIG. 3 without its cover 25, includes an upstanding frame 26 in which bearing sleeve 27 is fixedly journaled. The sleeve 27 includes a drive gear 28 secured to the outboard end thereof and such sleeve forms a socket for the nose 29 of the arbor 5. The inner end of the socket adjacent the gear includes a boss secured to the sleeve and gear which includes a key slot 30 receiving the transverse drive key 31 on the outer end of the nose 29.

Similarly, the nose 33 of the lower arbor 16 is received in sleeve 34 to which is secured gear 35. A projecting boss from the gear within the sleeve includes a key slot 36 adapted to receive transverse drive key 37 in the end of the nose 33.

Unlike the top sleeve, the bottom sleeve is journaled in a vertically movable journal block 38 driven for vertical movement by upwardly extending jack stem 39.

The gears 28 and 35 are drivingly interconnected by gearing seen at 41 in conventional fashion, such gearing being driven by right angle drive transmission 42 through output shaft 43. The transmission is driven by two motors seen at 45 and 46 with the motor 45 being an AC drive used for threading up the line. The motor 46 is a DC motor which normally runs at stall tension to boost the drive of the recoiler to take excess tension off of the slit strip between the recoiler and the slitter. The helper drive 46 insures that the knives rotate under the proper load.

The drive housing is secured to the base as indicated at 46 and when properly secured to the base the drive housing or its associated parts need not be assembled or disassembled to replace the removable head of the slitter as hereinafter described.

The base 10 includes on the top thereof parallel horizontal ways seen at 50 and 51 with the area therebetween being substantially open as indicated at 52. Supported on such ways for horizontal movement toward and away from the drive housing 12 is idle housing 14.

The idle housing 14 together with the arbors 15 and 16 forms the readily removable slitter head of the present invention.

The idle housing includes an upstanding frame 54 with a top arbor being journaled therein at 55.

A window (see FIG. 4) beneath the journal for the top arbor accomodates a vertically movable journal block 57 in which the lower arbor 16 is journaled as seen at 58.

The lower end of the frame 54 has secured thereto a horizontal base plate 60 which extends substantially asymmetrically in the direction of the arbors and the base plate and frame are braced by rather shallow height horizontally elongated gussets seen at 61 and 62. The base plate 60 includes four laterally extending slide feet, two on each side, as seen at 64 and 65. The slide feet support the idle housing for horizontal movement on the ways 50 and 51.

The idle housing also includes two vertically extending plates seen at 67 and 68 on the outer side of the frame 54 opposite the arbors 15 and 16. Such plates act as gussets rigidifying the upright housing with respect to its base or slide 60. Above the frame 54 the plates come together in the Y configuration seen at 70 with the juxtaposed ends of the plates forming the stem of the Y being provided with the lifting eye 71. The configuration of the movable head is such that the lifting eye is substantially above the center of gravity. Moreover, when the removable head is placed on a flat surface, the base or slide insures that the removable head will remain in an upright position with the arbors conveniently projecting for retooling.

Figures 4, 5, 7:
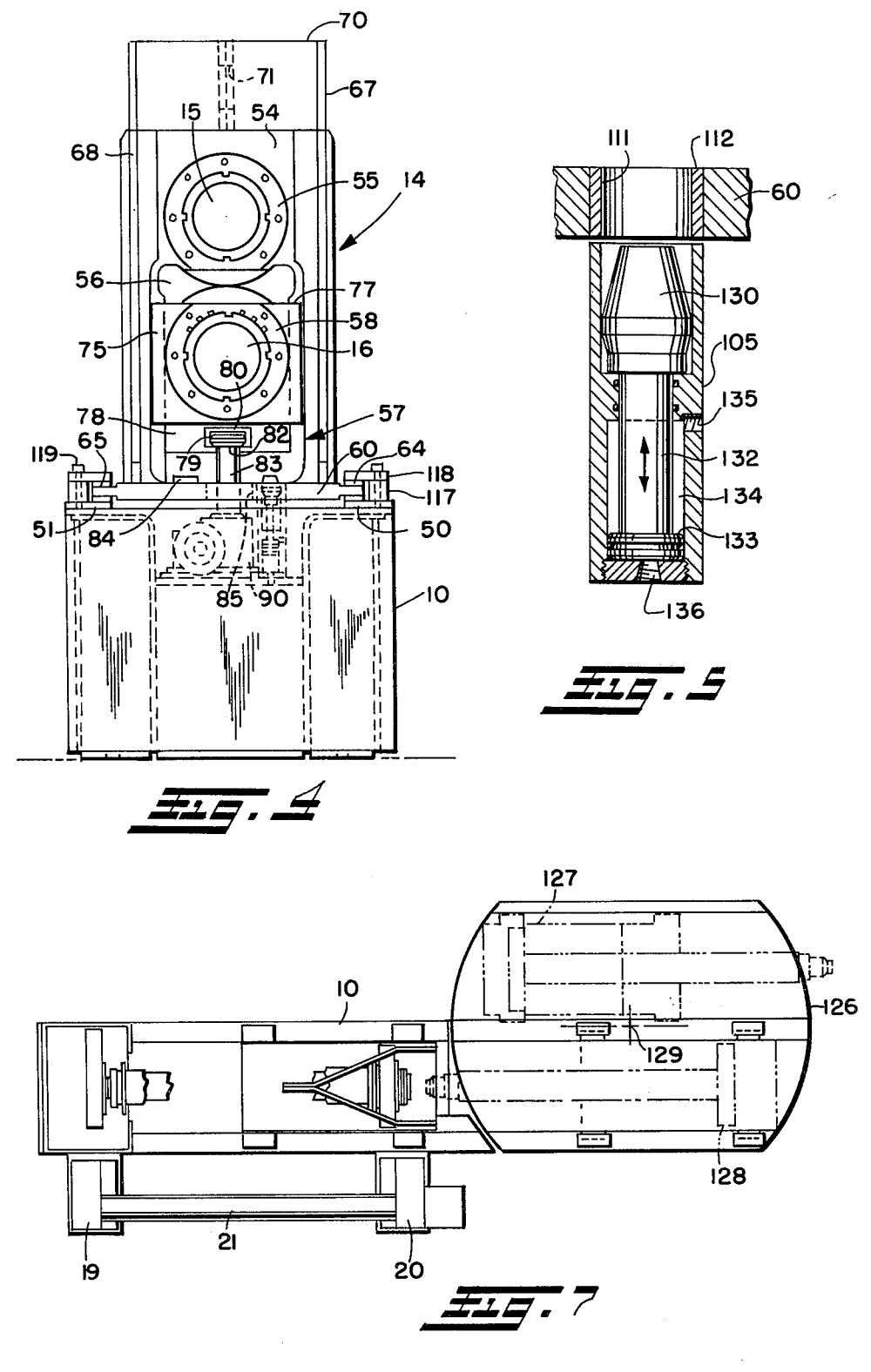

As seen perhaps more clearly in FIGS. 3 and 4, the journal box 57 for the lower arbor 16 includes an upper section 75, the lateral edges of which are slotted to receive ways 77 projecting from the vertical edges of the window 56. The journal box 57 includes a lower vertically depending portion 78, the lower edge of which is provided with a central T-slot indicated at 79. The underside of the T of the slot is provided with a removable bearing plate or shim 80, the edges of which in the axial direction of the arbors are beveled at a rather shallow angle to provide pilot surfaces. The T-slot or receptacle 79 in the lower edge of the journal block cooperates with beveled edge disc 82 on the top of jack stem 83. The base or slide 60 of the removable head 14 is provided with bearing pads 84 on each side of the T-slot 79 so that when the journal box is lowered and the lower edge of the box is supported on such bearing pads the weight of the journal box and the arbor journaled therein is removed from the top of the jack stem. In this manner, horizontal movement of the removable head engages and disengages the jack stem from the journal box. The slide 60 may be provided with an axially extending slot or opening 85 accommodating the jack stem and its associated disc.

As seen more clearly in FIGS. 2, 3 and 6, the slitter is provided with three jacks seen at 88, 89 and 90 with the vertically extending stems supporting discs 91, 92 and 82, all horizontally aligned. The jacks are supported on a sub-plate 93 in the base 10, such sub-plate being in turn supported by stool framing seen at 94, 95, and 96. The jacks are all driven by a single hydraulic motor 97. The motor 97 is coupled directly to the jack 90 as seen at 98 while the jacks 89 and 90 are drivingly connected by shaft 99 and the jacks 88 and 89 are connected by shaft 100, such shafts being similarly coupled to the jacks.

The motor, jacks and interconnecting shafts 99 and 100 in effect from a single line or jack shaft operating all three jacks concurrently. The jacks and jack drive being in the base are not moved or removed when the removable head is changed and such jacks need not be adjusted for horizontal alignment or parallelism when the head is removed and replaced. Because of the bottom jack system which remains with the base it is possible to obtain parallesism compensating for backlash not normally possible in upper arbor jack systems where the weight of the arbor is suspended from the jacks.

Adjacent to the jacks is a horizontally extending piston-cylinder assembly 103, the rod 104 of which is connected to horizontally movable actuator 105. The actuator is mounted in and retained for horizontal movement by guides 106 and 107. The actuator is elongated axially of the arbor and at each end includes upwardly projecting locating pins seen at 109 and 110. The locating pin 109 fits within the hole 111 in the slide or base 60 as seen in FIG. 2, such hole being lined with a bushing 112, as seen in FIG. 5. The locater pin 110 may fit within a similar hole in the slide, but such hole may be slightly elongated to slot form with the longitudinal axis of the slot being aligned with the hole 111 and also the axis of the arbors. This facilitates the placement of the removable head on the locator pins when the locater head is supported by an overhead crane or the like.

Referring again to FIG. 2, it will be seen that the base on the ways 50 and 51 is provided with at least two pairs of retainers as seen at 115 and 116. Each retainer includes a block 117 and an inwardly extending top plate 118 with the plate and block being secured to each other and to the top of the way or guide by sets of fasteners seen at 119. The way beneath, the block and the top inwardly extending plate form a U-shape retainer for the feet 64 and 65 projecting laterally from the base or slide 60 of the removable head. The retainers 115 and 116 are spaced the same as the feet on the removable head.

To remove the removable head 14, the piston-cylinder assembly is simply extended until the feet slide out from under the retainers. Such horizontal movement of the removable head automatically disconnects the jack from the journal block. When the feet are clear of the retainers, the head may then be simply lifted from the machine using the lifting eye 71 as seen in FIG. 2. No jack drive, hydraulic or electrical disconnects are required.

To replace the head, the crane lifts the removable head over the slitter and with the piston cylinder assembly 103 extended, the head is lowered onto the ways 50 and 51. The locater pins 109 and 110 engage the hole and slot as aforesaid properly to position the removable head in alignment with the drive housing sockets. The piston-cylinder assembly 103 is then retracted to assemble the removable head with the drive housing of the slitter. In such assembled position, the retainers 115 and 116 will overlie the feet on the slide of the removable head. The jacks may then be energized vertically to move the lower arbor 16.

When the removable head is in the operating position, the box lock-up seen at 120 in FIG. 3 may be positioned to bear against the journal box 57 to remove any slack between the vertical guides or grooves in the box and the guides at the edges of the window 56. The lock-up may include a spring loaded bearing rod 121 simply exerting a lock-up pressure against the journal box, such pressure being applied by relatively small piston cylinder assembly 122 aligned with the rod. The piston-cylinder assembly is mounted on bracket 123 on base 10. The piston-cylinder assembly and bracket are not part of the removable head. For the shorter arbor removable head 124 seen in phantom lines in FIG. 3 and in FIG. 9, the spring loaded bearing rod 125 is simply shorter.

The removable head 124 with the shorter arbors is similar to the removable head for the longer arbors with the exception that the pins engage on the outboard side of the idle housing frame, and interfits with the cap 92 on the top of the stem of the intermediate jack 89. Thus, with the intermediate length arbor head in place the jacks 88 and 89 are operative to move the lower arbor. If the longer arbor head is used, the jacks 88 and 90 are employed. The unused jack 89 or 90, of course, moves vertically with the jacks which are employed.

Referring now to FIG. 7, it will be seen that the slitter of the present invention may be employed with a turntable 126 adapted to oscillate or rotate intermittently 180°. The turntable is provided with two chordally extending sets of ways which accommodate two removable heads 127 and 128 extending in opposite directions symmetrically on each side of the center of the turntable. The removable head 128 in the position shown is axially aligned with the slitter and the removable head may be moved to and from such position by extension and retraction of the piston cylinder assembly 103. The removable head 127 in the position shown is in a storage or retooling position. The position 127 may be used either for retooling or may be used as an intermediate storage position simply to permit an overhead crane to remove or replace the head at the convenience of the crane. In any event, by rotation of the turntable, the positions of the heads may be alternated and in the position of the head seen at 128 it may quickly and readily be assembled and placed in operation.

In order to facilitate the horizontal displacement of the removable slitter head, the locating pins in the actuator 105 may be retracted as seen in FIG. 5. The pin 130 includes an enlarged rod 132 having on the lower end thereof piston 133 moving in cylinder 134. Ports 135 and 136 permit the piston cylinder assembly to be double acting to move and retract the pin 130 from a position above the slide 60 to a position below the slide.

It can now be seen that there is provided a readily removable and replaceable slitter head having no power gearing, jack, hydraulic or electrical connections. With the low cost removable and replaceable head of the present invention, the head may be removed and replaced in a matter of a few minutes. Moreover, the low cost permits a slitter operator to carry a number of such heads in inventory for storage or retooling minimizing the down time of the slitting line.

Other modes of applying the principles of the invention may be employed, change being made as regards the details described, provided the features stated in any of the following claims or the equivalent of such be employed.

The embodiments of the invention in which an exclusive property or privilege is claimed defined as follows:

1. A slitter comprising a pair of arbors; a drive housing and idle housing supporting said arbors at opposite ends respectively; a base on which said drive and idle housings are mounted; and means to move said idle housing horizontally away from said drive housing to disconnect said arbors from said drive housing for removal of said idle housing and arbors from the slitter; said idle housing including a vertically movable journal for one of said arbors, a jack for said journal, said means to move said idle housing being operative to disconnect said jack from said vertically movable journal and vice versa; said idle housing also including a slide mounted on said base, and said means to move said idle housing including a horizontally movable actuator for said slide mounted on said base; and positioning means, including a hole and a slot, on said idle housing slide adapted to position said idle housing on said actuator in a predetermined position and alignment for such horizontal movement; said actuator including upwardly projecting pilot pins adapted to fit within said hole and slot, respectively.

2. The slitter as set forth in claim 1 wherein said pilot pins are retractable whereby said idle housing may be moved laterally horizontally from said actuator.

3. The slitter as set forth in claim 2 including means to move said idle housing laterally horizontally of such alignment.

4. The slitter as set forth in claim 3 wherein said means to move said idle housing laterally horizontally includes a turntable operative to move said idle housing to and from a secondary position out of such alignment.

5. The slitter as set forth in claim 4 wherein said turntable includes means to support at least two idle housings.

6. The slitter as set forth in claim 5 wherein said means to support is adapted to support such idle housings chordally of said turntable with the arbors extending in opposite directions.

* * * * *